(12) United States Patent
Sekino et al.

(10) Patent No.: US 9,219,359 B2
(45) Date of Patent: Dec. 22, 2015

(54) SLIDING POWER SUPPLY DEVICE

(71) Applicant: Yazaki Corporation, Tokyo (JP)

(72) Inventors: Tsukasa Sekino, Makinohara (JP); Shinji Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 85 days.

(21) Appl. No.: 14/180,503

(22) Filed: Feb. 14, 2014

(65) Prior Publication Data

US 2014/0231131 A1  Aug. 21, 2014

(30) Foreign Application Priority Data

Feb. 19, 2013  (JP) ................................. 2013-029764

(51) Int. Cl.
*H05K 7/14* (2006.01)
*H02G 11/00* (2006.01)
*H01B 7/00* (2006.01)
*B60R 16/027* (2006.01)

(52) U.S. Cl.
CPC ............ *H02G 11/006* (2013.01); *B60R 16/027* (2013.01); *H01B 7/0045* (2013.01); *H02G 11/00* (2013.01)

(58) Field of Classification Search
CPC ........ H01B 7/00; H01B 7/0045; B60R 16/02; B60R 16/00; B60R 16/0207; H02G 11/00; H02G 11/006; H02G 15/06; H02G 15/064; H02G 15/103
USPC ............. 174/542, 50, 520, 535, 559, 543, 60, 174/68.1, 68.3, 72 A, 73.1, 74; 439/76.1, 439/76.2; 248/49, 68.1
See application file for complete search history.

(56) References Cited

U.S. PATENT DOCUMENTS

| | | | | |
|---|---|---|---|---|
| 6,997,499 | B2 * | 2/2006 | Tsubaki et al. | 174/72 A |
| 7,053,306 | B2 * | 5/2006 | Tsubaki et al. | 174/72 A |
| 7,306,481 | B2 * | 12/2007 | Tsukamoto | 174/72 A |
| 7,381,897 | B2 * | 6/2008 | Nishijima et al. | 174/72 A |
| 7,829,789 | B2 * | 11/2010 | Yamaguchi | 174/72 A |

(Continued)

FOREIGN PATENT DOCUMENTS

| | | |
|---|---|---|
| JP | 2006-035961 A | 2/2006 |
| JP | 2006-036155 A | 2/2006 |

(Continued)

OTHER PUBLICATIONS

European Search Report dated May 30, 2014, issued for the European patent application No. 14153911.4.

*Primary Examiner* — Angel R Estrada
(74) *Attorney, Agent, or Firm* — Locke Lord LLP

(57) ABSTRACT

Provided is a sliding power supply device which can reduce entire length of a case extendably housing a wiring harness, for a large slide stroke of a sliding seat and such. The sliding power supply device includes a long case extendably housing a wiring harness, a slider arranged slidable in a longitudinal direction of the case and arranged to lead out the wiring harness to outside of the case, and an extra length absorption portion arranged to support a wiring harness portion lead outside of the case such that the wiring harness portion is lead out at location further away from a movement end of the slider in the longitudinal direction of the case. The extra length absorption portion is a subcase having at least a bottom plate portion. Both ends of the wiring harness portion in a movement direction of the slider are positioned at the same height.

4 Claims, 5 Drawing Sheets

(56) References Cited

U.S. PATENT DOCUMENTS

| | | | |
|---|---|---|---|
| 7,910,832 B2* | 3/2011 | Pieh et al. | 174/68.3 |
| 8,575,487 B2* | 11/2013 | Agusa | 174/68.3 |
| 2006/0030174 A1 | 2/2006 | Tsubaki et al. | |
| 2006/0060370 A1 | 3/2006 | Goto et al. | |
| 2007/0243729 A1 | 10/2007 | Tsubaki et al. | |
| 2012/0024561 A1 | 2/2012 | Sekino et al. | |

FOREIGN PATENT DOCUMENTS

| | | |
|---|---|---|
| JP | 2006-074980 A | 3/2006 |
| JP | 2006-311700 A | 11/2006 |
| JP | 2010-193599 A | 9/2010 |

* cited by examiner und is covered and hidden by a mat (not shown). An upper wall (i.e. an upper case) of the case 32 is formed into a concavo-convex shape to increase the rigidity against pushing by a passenger's foot and such. The fixation portion 35 of the movable block 36 is fixed to the sliding seat by thread fastening and such.

SLIDING POWER SUPPLY DEVICE

CROSS REFERENCE TO RELATED APPLICATION

This application is on the basis of Japanese Patent Application No. 2013-029764, the contents of which are hereby incorporated by reference.

TECHNICAL FIELD

The present invention relates to a sliding power supply device for long slide applied for example to a sliding seat and such of an automobile.

BACKGROUND ART

Conventionally, various sliding power supply devices have been proposed for constantly supplying power to an electric component and an accessory and such provided in a sliding seat of an automobile, for example.

For example, Patent Literature 1 (not shown) discloses a long slide-type sliding power supply device, wherein a wiring harness is wired in a horizontally-long case in an extra length absorbable fashion by bending the wiring harness in a substantially U-like or J-like shape, wherein the wiring harness is supported by a harness support provided in the case to prevent droop or curve of the wiring harness in the case, wherein a slider is slidably engaged to a slit provided at one side of the case, and wherein one end side of the wiring harness is lead out from the slider and connector connected to a sliding structure such as a sliding door or a sliding seat, and the other end side of the wiring harness is lead out from an opening at the other side of the case and connector connected to a fixed structure such as a vehicle body or a vehicle floor.

Patent Literature 2 discloses a sliding power supply device, a similar example of which is shown in FIG. 7. Although an entire length of this sliding power supply device 31 is shorter than the sliding power supply device disclosed in Patent Literature 1, it is for the long slide as well. In FIG. 7, for convenience, a movable portion of the sliding power supply device 31 at front and back movement ends is indicated by a solid line, respectively (in fact, one is indicated by a solid line and the other is indicated by a two-dot chain line).

The sliding power supply device 31 includes a horizontally-long case 32 made of metal, a slider 34 which is passing through a slit 33 provided at an upper portion of the case 32 and which is slidably engaged to a rail (not shown) provided at a bottom portion of the case 32, a movable block 36 fixed to an outer exposed portion of the slider 34, a fixation portion (i.e. a bracket) 35 provided to the movable block 36, and a wiring harness (not shown) which is wired in the case 32 in an extra length absorbable fashion by bending the wiring harness in a substantially U-like or J-like shape and which has one end side fixed to the slider 34 and the other end side fixed to the case 32.

The one end side portion of the wiring harness is passed through the slit 33 of the case 32 and lead out from the slider 34 toward a sliding seat (not shown) and connected to an electric component or an accessory of the sliding seat. The other end side portion of the wiring harness is lead out from a back opening 37 of the case 32 to a vehicle floor side and connected to a wiring harness (not shown) of a power source side.

The slit 33 of the case 32 is narrowed by a molding 38 made of synthetic resin to prevent a foreign object and such from entering into the case 32. The case 32 is disposed on the vehicle floor and is covered and hidden by a mat (not shown). An upper wall (i.e. an upper case) of the case 32 is formed into a concavo-convex shape to increase the rigidity against pushing by a passenger's foot and such. The fixation portion 35 of the movable block 36 is fixed to the sliding seat by thread fastening and such.

When the sliding seat is moved forward to a foremost position, the fixation portion 35 is located at a frontend side of the case 32, and when the sliding seat is moved backward to a backmost position, the fixation portion 35 is located at a backend side of the case 32. In FIG. 7, a reference sign L7 denotes the horizontal movement distance in a front-back direction of the fixation portion 35, i.e. the slide stroke (i.e. the slide amount) of the slider 34, and a reference sign L8 denotes the entire length of the case 32.

Furthermore, Patent Literature 3 (not shown) discloses separately forming a long slider movement portion and a short harness housing portion and forming a case by parallelly-connecting frontends of the long slider movement portion and the short harness housing portion by a semi-circular guide member, fixing one side of a wiring harness to a slider disposed to the slider movement portion, folding the other side of the wiring harness in a substantially U-like fashion and housing it in the harness housing portion, fixing the slider to the sliding seat, and with the movement of the slider (i.e. the seat), absorbing an extra length of the wiring harness by extending and contracting the wiring harness in the harness housing portion. A seat guide rail for sliding a seat mounting portion is provided adjacent to and in parallel to the slider movement portion.

CITATION LIST

Patent Literatures

Patent Literature 1: Japan Patent Application Publication No. 2006-74980 (FIG. 3)
Patent Literature 2: Japan Patent Application Publication No. 2006-35961 (FIGS. 1-3)
Patent Literature 3: Japan Patent Application Publication No. 2010-193599 (FIGS. 1-6)

SUMMARY OF INVENTION

Problem to be Solved

However, the above-mentioned conventional sliding power supply device 31 shown in FIG. 7 has a problem that, it is required to set the entire length L8 of the case 32 to be longer as the slide stroke of the sliding structure such as the sliding seat is increased, causing a difficulty in mounting the case 32, i.e. the sliding power supply device 31, in the space of a fixed structure side such as a floor space. Furthermore, as in the case of the above-mentioned Patent Literature 1, there is a problem that, it is necessary to provide a member for preventing the droop or undesired curve of the wiring harness in the case, causing the structure in the case to be complicated and costly.

In view of the above-mentioned problem, an object of the present invention is to provide a sliding power supply device which can reduce and downsize an entire length of a case housing a wiring harness in an extra length absorbable fashion, even if a sliding stroke of a sliding structure such as a sliding seat is large.

Solution to Problem

In order to achieve the above-described object, the present invention provides, in a first aspect, a sliding power supply device including a long case housing a wiring harness in an extendable and contractable fashion, a slider arranged slidable in a longitudinal direction of the case and arranged to lead out the wiring harness to outside of the case, and an extra length absorption portion arranged to support a wiring harness portion lead outside of the case such that the wiring harness portion is lead out from the extra length absorption portion at a location further away from a movement end of the slider in the longitudinal direction of the case.

According to the features described above, when the case is disposed to a fixed structure side and the extra length absorption portion is disposed at a sliding structure side and such, and when the sliding structure is moved in the longitudinal direction of the case, the extra length absorption portion is moved together with the sliding structure, and at the same time with or before or after the slider has moved to a slide end of the case, the wiring harness portion lead outside of the case is lead out, by a harness lead out portion of the extra length absorption portion, at a location further away (i.e. distant) from the movement end of the slider in the longitudinal direction of the case.

Thus, even if the entire length of the case is shorter than that of the conventional art, the same movement stroke of the wiring harness as the conventional art can be obtained. If the entire length of the case is the same as that of the conventional art, then the movement stroke of the wiring harness can be larger than that of the conventional art. A first extra length absorption can be achieved by the case, and a second extra length absorption can be achieved by the extra length absorption portion. Thus, "case" may be referred to as a first extra length absorption portion, and "extra length absorption portion" may be referred to as a second extra length absorption portion.

The present invention provides, in a second aspect, the sliding power supply device according to the first aspect, wherein the extra length absorption portion is a subcase having at least a bottom plate portion, wherein the slider is engaged to the subcase so as to be slidable in the longitudinal direction of the case, and wherein the wiring harness portion lead outside of the case is disposed in the subcase in an extendable and contractable fashion.

According to the features described above, when the sliding structure is moved in the longitudinal direction of the case, the subcase as the extra length absorption portion is moved together with the sliding structure, and at the same time with or before or after the slider has moved to the slide end of the case, the wiring harness portion lead outside of the case is lead out at the location further away (i.e. distant) from the movement end of the slider in the longitudinal direction of the case by the harness lead out portion (e.g. an opening) of the subcase. The subcase may include at least the bottom plate portion which can support the wiring harness portion without the droop. The upward curvature or uplift of the wiring harness can be prevented if the subcase includes an upper plate portion, and also undesired projection of the wiring harness toward the side direction can be prevented if the subcase includes a peripheral wall portion arranged at a periphery of the bottom plate portion.

The present invention provides, in a third aspect, the sliding power supply device according to the first aspect, wherein both ends of the wiring harness portion in a movement direction of the slider are positioned at the same height, and wherein a harness extra length is absorbed by an extending and contracting action of the wiring harness portion.

According to the features described above, the circumferential twist of the wiring harness portion can be prevented, thereby improving the durability of the wiring harness.

Advantageous Effects of Invention

According to the invention described in the first aspect, the extra length absorption amount which is the sum of the first extra length absorption and the second extra length absorption of the wiring harness can be obtained by achieving the first extra length absorption of the wiring harness by the case and achieving the second extra length absorption of the wiring harness by the extra length absorption portion. Thus, even if the slide stroke of the sliding structure such as the sliding seat is large, the entire length of the case housing the wiring harness in an extra length absorbable fashion can be reduced and downsized. Therefore, the case for constantly supplying power to the sliding structure such as the sliding seat of the vehicle can be mounted to the fixed structure such as the vehicle floor in a reduced (i.e. conserved) space without interfering with other components. Furthermore, unlike the conventional long slide-type power supply device, it is not necessary to provide a member for preventing the droop or curve of the wiring harness in the case, thereby simplifying the case and reducing the cost.

According to the invention described in the second aspect, by using the subcase having at least the bottom plate portion as the extra length absorption portion, the wiring harness portion lead outside of the case can be stably supported without the droop. By doing so, the extra length absorption of the wiring harness portion in the subcase can be achieved smoothly and reliably.

According to the invention described in the third aspect, the circumferential twist of the wiring harness portion can be prevented, thereby improving the durability of the wiring harness and improving the reliability of the constant power supply.

DESCRIPTION OF EXEMPLARY EMBODIMENTS

Figure 1:
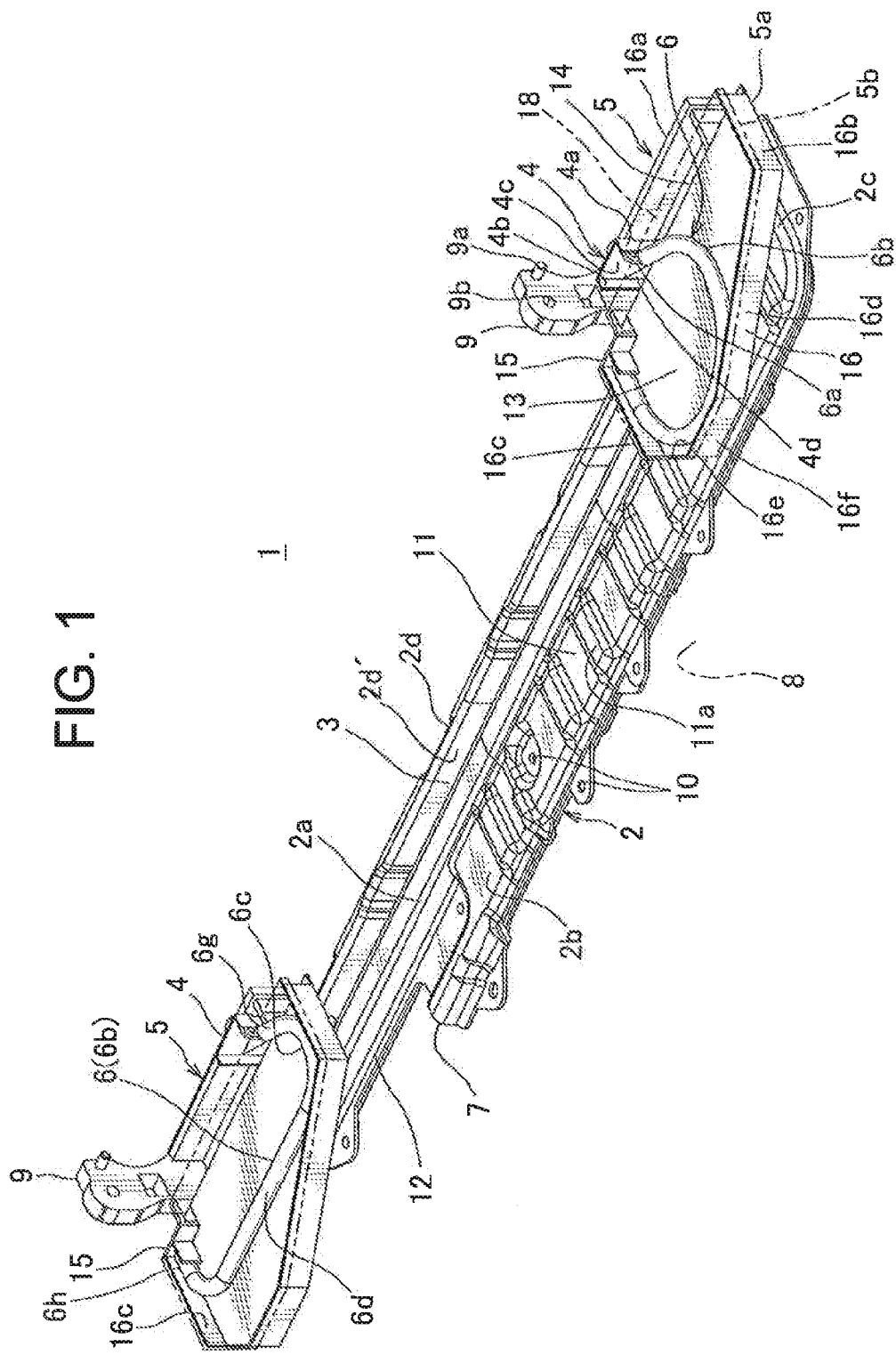
FIG. 1 is a perspective view of one embodiment of a sliding power supply device according to the present invention.
Figure 2:
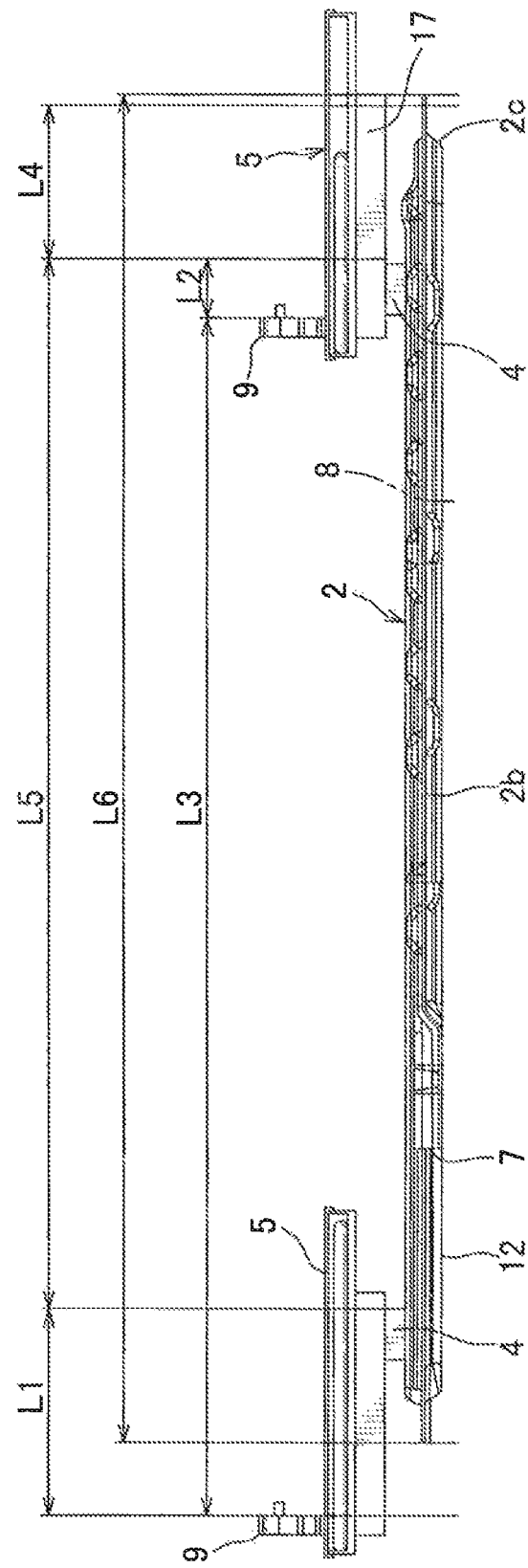
FIG. 2 is a side view of the sliding power supply device.

FIGS. 1-2 show one embodiment of a sliding power supply device according to the present invention. In the drawings, for convenience, a movable portion of the sliding power supply device at front and back movement ends is shown in a solid line.

The sliding power supply device 1 includes a horizontally-long case (i.e. a main case) 2 made of metal, a slider (i.e. a movable portion) 4 arranged to slidably move along a slit (i.e. an opening) 3 near one side of the case 2, a subcase (i.e. a movable portion) 5 made of synthetic resin which is connected and fixed to the slider 4 and disposed on the case 2 so as to move forward and backward, and a wiring harness 6 wired in the case 2 in an extra length absorbable fashion by bending the wiring harness 6 in a substantially U-like or J-like shape, such that a longitudinal middle portion 6a of the wiring harness 6 is fixed to the slider 4, one end side 6b of the wiring harness 6 is wired from the slider 4 into the subcase 5 in an extendable and contractable fashion (i.e. in an extra length absorbable fashion), and the other end side (not shown) of the wiring harness 6 is lead out from a back opening 7 located at the other side of the case 2.

Figure 7:
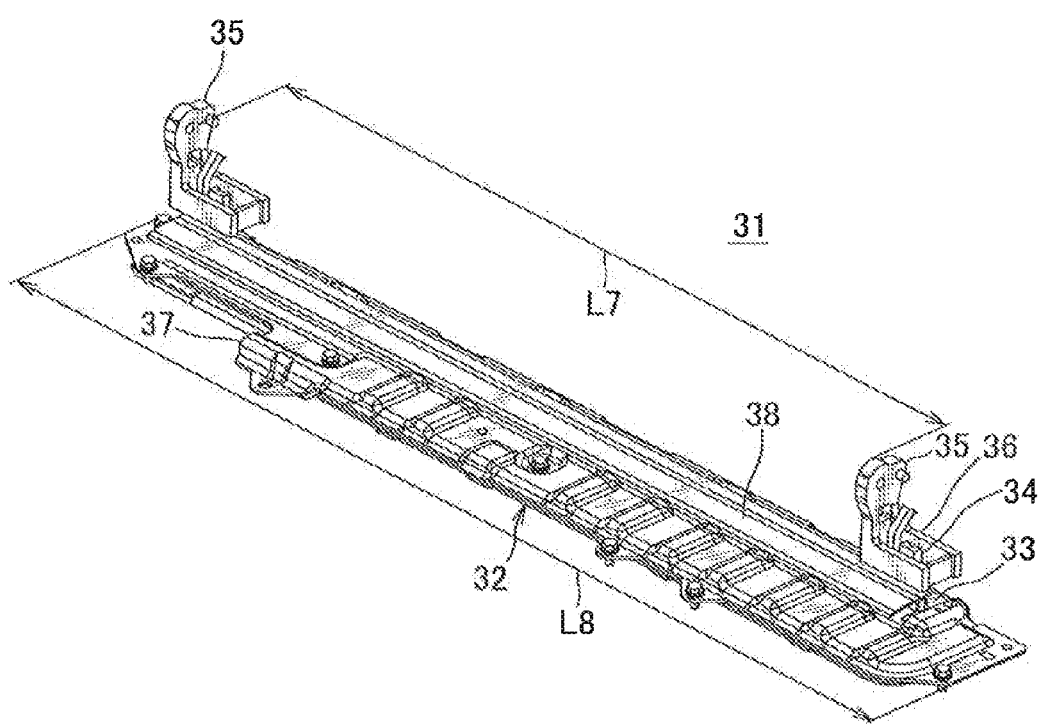
FIG. 7 is a perspective view of one embodiment of a conventional sliding power supply device.

The case 2 has a shape similar to the conventional case shown in FIG. 7; however, an entire length of the case 2 (shown in FIG. 2) is shorter than the entire length of the conventional case (shown in FIG. 7). The entire length of the case 2 is made short by absorbing the extra length of the wiring harness 6 also in the subcase 5 not only in the case 2.

In this example, the case 2 is horizontally disposed and fixed at a floor 8 side (i.e. a mount side) of a vehicle such that a longitudinal direction of the case 2 is matched with a front-back direction of the vehicle, and the subcase 5 is horizontally disposed at a sliding seat side (not shown) and fixed to the sliding seat by an integrally-formed fixation portion 9 of the subcase 5 or by a separate fixation portion (9) fixed to the subcase 5. The case 2 is fixed to the vehicle floor 8 by inserting a bolt or a fixing clip (not shown) into a hole 10 located e.g. at a periphery of the case 2. A horizontal upper wall 11 of the case 2 includes a concavo-convex shaped portion 11a to increase the rigidity against pushing by a passenger's foot.

In the drawings, right side corresponds to a vehicle front side, and left side corresponds to a vehicle back side. The case 2 includes, at one side, a portion 2a having the slit 3 and extending long in the backward direction (in the drawing, a reference sign 12 denotes a backward extending portion), and a portion 2b located at the other side of the case 2 and formed slightly shorter. In an inner space of the case 2, from the one side to the other side, the wiring harness 6 is bent and wired in a substantially U-like or J-like shape.

When the slider 4 is moved together with the subcase 5 to a forward end (i.e. a right end in the drawing) along the case 2, an U-like turning portion (i.e. a bent portion) (not shown) of the wiring harness 6 is located at an inner side of a frontend portion 2c of the case 2. When the slider 4 is moved backward together with the subcase 5 to a backward end (i.e. a left end in the drawing) along the case 2, the U-like turning portion (i.e. the bent portion) (not shown) of the wiring harness 6 is moved backward from the frontend portion 2c to a middle portion of the case 2.

Here, the wiring form of the wiring harness in the case 2 can be arbitrarily set as necessary. For example, as disclosed in the above-mentioned Patent Literature 3, the wiring harness portion in the long portion 2a at one side of the case 2 can be fixed to the slider 4 and wired in an extendable and contractable fashion, while the wiring harness portion in the short other side portion 2b of the case 2 can be folded and bent into the substantially U-like shape and wired in an extendable and contractable fashion. This is explained in more detail hereinafter in reference to FIG. 6.

A slit (i.e. an opening) 14 extending in the front-back direction is provided to one side of a bottom wall 13 of the subcase 5 and located opposingly above the slit 3 at the one side of the case 2. A vertical portion (i.e. a harness guide portion also indicated by the reference sign 4) of the slider 4 is penetrating from the slit 3 of the case 2 to the slit 14 of the subcase 5 and is movably located along each of the slits 3, 14. That is, the vertical portion of the slider 4 is arranged to move along the slit 3, and simultaneously or independently, the vertical portion of the slider 4 is movable along the slit 14 of the subcase 5.

In this example, the vertical portion of the slider 4 is formed to have a cross-section of a substantially U-like shape with front and back wall portions 4a, 4b and a wall portion 4c located at one side. For example, the slit 3 of the case 2 is formed between a vertical inner face 2d' of one side wall 2d of the case 2 and a vertical inner face of the long portion 2a at one side of the case 2. The inner face 2d' of the one side wall 2d acts as a guide face for the wall portion 4c at one side of the vertical portion of the slider 4, and the vertical inner face of the long portion 2a at one side acts as a guide face for the wiring harness 6 in the case 2. A horizontal portion at bottom side (not shown) of the slider 4 is slidably engaged to a guide rail (not shown) located at a lower side of or near the slit 3 of the case 2. The structure of the case 2 and the slider 4 is similar to that of the conventional structure disclosed in Patent Literature 2.

The wiring harness 6 is inserted and guided from the case 2 into the subcase 5 along the vertical portion of the slider 4, and the wiring harness portion 6b in the subcase 5 is bent into a substantially loop-like shape from a side opening 4d located at an upper side of the vertical portion of the slider 4 and is wired through an opening (i.e. a harness lead-out portion) 15 located at one side at the backend side of the subcase 5 to the sliding seat side.

In this example, the subcase 5 is constituted of a subcase body 5a and an upper cover portion 5b indicated by a dotted line, and is formed into a substantially rectangular shape (to be exact, a substantially hexagonal shape) which is somewhat horizontally-long in the longitudinal direction of the case (i.e. the main case) 2. The subcase body 5a includes the horizontal bottom wall (i.e. the bottom plate portion) 13 and a vertical peripheral wall 16 located at front-back and right-left sides. The slit 14 is provided at one side of the bottom wall 13, and the vertical portion of the slider 4 is slidably guided along an inner face of a vertical side wall (i.e. a portion of the peripheral walls) 16a located at one side of the slit 14. The peripheral wall 16 is composed of the straight one side wall 16a arranged along the longitudinal direction of the case, front and back walls 16b, 16c, a long slanted wall 16d at a front side, a short slanted wall 16e at a back side and a short straight wall 16f connecting the both slanted walls, the slanted wall 16d, the slanted wall 16e and the straight wall 16f constituting walls located at the other side.

The fixation portion 9 is located at a backend of the one side wall 16a of the subcase body 5a and is extending upward so as to cover a backend of the slit 14. The fixation portion 9 can act as an abutting stopper for the slider 4. For example, the fixation portion 9 includes a positioning pin 9a for the sliding seat and a fixation bolt insertion hole 9b or a nut provided in the hole 9b. The opening (i.e. the harness lead-out portion) 15 for leading out the wiring harness is provided at one side end of the vertical back wall (i.e. a portion of the peripheral wall) 16c of the subcase body 5a. The wiring harness portion 6b in the subcase 5 is lead out from the opening 15 through the back side of the fixation portion 9 to the sliding seat side.

A horizontally-long frame-like portion 17 (see FIG. 2) communicated with the slit 14 of the bottom wall 13 and forming the deep slit is integrally-formed at one side of a lower face of the bottom wall 13 of the subcase body 5a. The frame-like portion 17 is provided for adjusting the height of the subcase 5. However, the frame-like portion 17 is not necessary if the sliding seat (not shown) is low.

The cover portion 5b of the subcase 5 is fixed to the subcase body 5a by a fixation member and such so as to cover the harness housing space in the subcase 5, thereby preventing the uplift of the wiring harness portion 6b and such in the harness housing space and preventing the outside interference. In this example, one side of the cover portion 5b is opened in a slit-like fashion, and the wiring harness portion 6b is introduced from the vertical portion of the slider 4 through a side opening 18 of the cover portion 5 into the subcase body 5a.

The wiring harness portion 6b in the subcase 5 is wired in an extendable and contractable fashion along a horizontal upper face of the bottom wall 13 of the subcase body 5a. As shown in the left side of each drawing, when the sliding seat (not shown) is moved backward and the subcase 5 is moved together with the sliding seat to the backward end along the case 2, the vertical portion of the slider 4 is moved to the backend of the slit 3 of the case 2 and stopped, and the slit 14 of the subcase 5 is slid and moved backward with respect to the vertical portion of the slider 4, thereby maximizing a horizontal distance L1 (see FIG. 2) between the vertical portion of the slider 4 and the fixation portion 9 of the subcase 5 (in other words, the fixation portion 9 is largely separated backward from the slider 4). During this time, the wiring harness portion 6b in the subcase 5 is extended in the front-back direction in a substantially oblong loop-like fashion.

In other words, the wiring harness portion 6b in the subcase 5 is lead out forward from the vertical portion of the slider 4, and is folded backward into a substantially U-like shape (a fold portion is indicated by a reference sign 6c) so as to extend straightly (a straight portion is indicated by a reference sign 6d), and is lead out from the back opening 15 to the sliding seat side along the back wall 16c of the subcase 5.

In the horizontal subcase 5, an end portion 6g of the wiring harness portion 6 located at the slider 4 side and an end portion 6h of the wiring harness portion 6 located at the back opening 15 side are positioned at the same height on an imaginary straight line extending in the front-back direction, i.e. a slide axis direction. This is the same for the wiring harness portion 6b in the subcase 5 which is moved to the frontend side of the case 2. As the subcase 5 moves in the front-back direction along the case 2, the harness extra length is absorbed only by the bending action of the wiring harness portion 6b in the subcase 5, i.e. the action of decrease/increase in diameter (or size) of the curvature of the wiring harness portion 6b. By doing so, the circumferential twist of the wiring harness portion 6b in the subcase 5 and of a wiring harness portion lead out from the subcase 5 to the slider 4 side or to the back opening 15 side can be prevented, thereby improving the durability of the wiring harness 6.

For example, the wiring harness portion 6b in the subcase 5 is fixed at the vertical portion of the slider 4 and at the back opening 15 by a banding band or the like. The wiring harness portion 6 in the subcase 5 and in the case 2 is made of a plurality of insulator-coated electric wires covered for example with a protective tube such as a corrugated tube made of synthetic resin and having a good flexibility. The wiring harness portion 6a in the vertical direction arranged along the vertical portion of the slider 4 is not covered with the protective tube, instead the plurality of electric wires are exposed.

Furthermore, as shown in the right side in each drawing, when the sliding seat is moved forward and the subcase 5 is moved together with the sliding seat to the forward end along the case 2, the vertical portion of the slider 4 is moved to the frontend of the slit 3 of the case 2 and stopped, and the slit 14 of the subcase 5 is slid and moved forward with respect to the vertical portion of the slider 4, thereby minimizing a horizontal distance L2 (see FIG. 2) between the vertical portion of the slider 4 and the fixation portion 9 of the subcase 5 (e.g., the back wall 4b of the vertical portion of the slider 4 is abutted on a front face of the fixation portion 9). During this time, the wiring harness portion 6b in the subcase 5 is contracted in the front-back direction in a substantially circular loop-like fashion at a backward portion of the subcase 5.

In other words, the wiring harness portion 6b in the subcase 5 is lead out forward from the vertical portion of the slider 4, is bent backward in a substantially arc-shaped fashion (in the drawing, a curved portion is indicated by a reference sign 6b), and is lead out from the back opening 15 to the sliding seat side along the back wall 16c of the subcase 5.

Thus, as shown in FIG. 2, when compared to the conventional art shown in FIG. 7, the length of the slit 3 of the case 2. i.e. the entire length L6 of the case 2, can be reduced for substantially the length of the slit 14 of the subcase 5, i.e. for the amount of stroke L4 of the slider 4 along the slit 14 of the subcase 5, thereby downsizing the case 2 in the longitudinal direction. The total amount of stroke L3 of the fixation portion 9, i.e. the sliding seat, is the sum of the amount of stroke L4 at the sliding seat side, i.e. the amount of stroke of the slider 4 along the slit 14 of the subcase 5, and the amount of stroke L5 at the vehicle floor side, i.e. the amount of stroke of the slider 4 along the slit 3 of the case 2.

When the sliding seat is moved forward, i.e. when the subcase 5 is moved forward, the frontend 16b of the subcase 5 is projected further forward than the frontend of the case 2; however, since the subcase 5 is disposed at the sliding seat side, it does not disturb the reduction, by the downsized case 2, of the space for the case mounting portion of the vehicle floor 8. If the entire length L6 of the case 2 is the same as that of the conventional art shown in FIG. 7, then the front-back stroke L3 (see FIG. 2) of the fixation portion 9, i.e. the sliding seat, can be increased more than the conventional art.

During the forward and backward movement of the sliding seat, it is arbitral whether the subcase 5 is moved forward or backward along the vertical portion of the slider 4 after the slider 4 is moved along the slit 3 of the case 2 to the frontend or to the backend of the slit 3, or the subcase 5 is moved forward or backward along the vertical portion of the slider 4 simultaneously with the slider 4 moves forward or backward along the slit 3 of the case 2.

Figure 3:
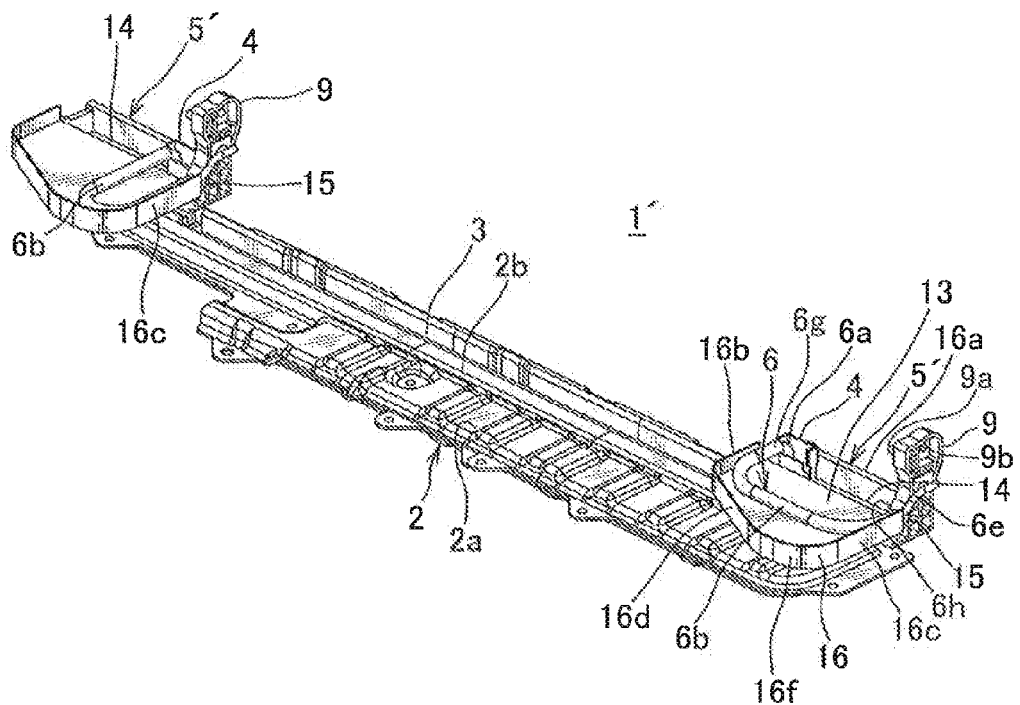
FIG. 3 is a perspective view showing a modified example of a sliding power supply device according to the present invention.
Figure 4:
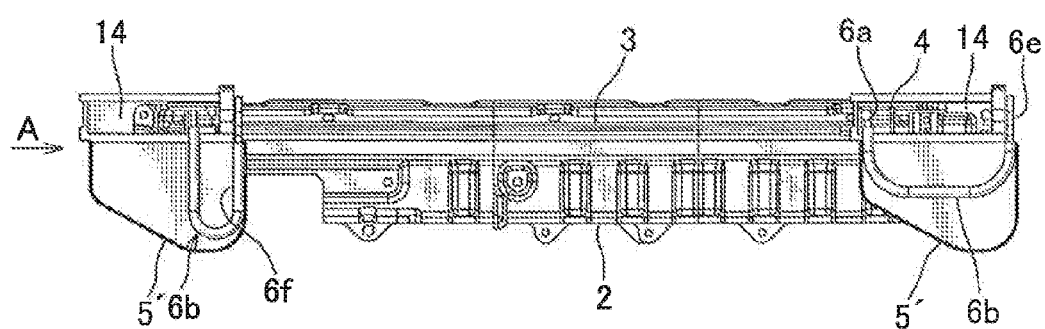
FIG. 4 is a plan view of the sliding power supply device.
Figure 5:
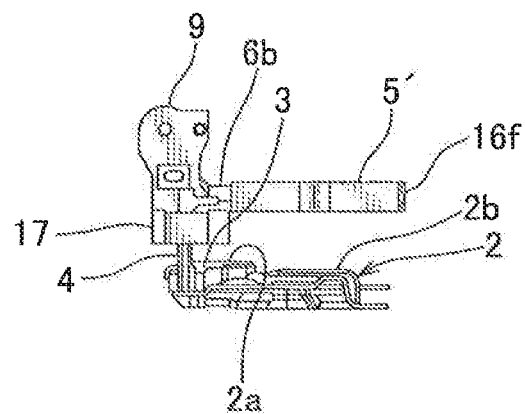
FIG. 5 is a back view of the sliding power supply device seen from an arrow A of FIG. 4.

FIGS. 3-5 show a sliding power supply device 1' including a modified example of the above-mentioned subcase 5 (i.e. a subcase 5').

Compared to the sliding power supply device 1 shown in FIGS. 1-2, the subcase 5' is mounted to a slider 4 of a case 2 such that the subcase 5' is arranged back to front (i.e. turned backward). The structure of the case 2, the wiring harness portion in the case 2 and the slider 4 is similar to that shown in FIGS. 1-2, and components similar to those shown in FIGS. 1-2 are denoted by the same reference signs to omit detailed explanation. For the subcase 5', only the subcase body is shown, and the cover portion is not shown or not used. For convenience, the movement portion such as the subcase 5' at the front and back ends is indicated by a solid line.

As shown in FIGS. 3-4, the subcase 5' is formed into a substantially rectangular shape (i.e. a substantially quadrangular shape) by a horizontal bottom wall 13 and a vertical peripheral wall 16, the vertical peripheral wall 16 including a long front wall 16c, a short back wall 16b, a vertical low one side wall 16a, a slanted other side wall 16d, and a curved wall 16f connecting the walls 16c, 16d. In this example, an upper end of the one side wall 16a is positioned at the same height as the upper face of the bottom wall 13, and a slit 14 located at one side of the bottom wall 13 is in communication with a slit of a lower frame-like portion 17 (see FIG. 5). A fixation portion 9 is extending upward at one side of the front wall 16c. The fixation portion 9 includes a positioning pin 9a and a fixation nut 9b.

A wiring harness portion 6b introduced into the subcase 5' from a vertical portion (i.e. a harness guide portion) of the slider 4 is lead out to a sliding seat side along the front wall 16c of the subcase 5' (in the drawing, a reference sign 6e denotes the lead out harness portion). As shown in the left side of each drawing, when the subcase 5' is moved backward together with the sliding seat to a backmost position, the slider 4 is moved to a backend of the slit 3 of the case 2, and the subcase 5' is moved further backward along the vertical portion of the slider 4 located in the slit 3.

The vertical portion of the slider 4 is located at a frontend of the slit 14 of the subcase 5', and the wiring harness portion 6b introduced into the subcase 5' from the vertical portion of the slider 4 is compressed (contracted) in the front-back direction at a front-half portion of the subcase 5' and is bent into a substantially U-like shape, and a folded portion 6f (shown in FIG. 4) is lead out from a front opening 15 along the front wall 16c of the subcase 5'.

Furthermore, as shown in the right side in each drawing, when the subcase 5' is moved forward together with the sliding seat to a foremost position, the slider 4 is moved to a frontend of the slit 3 of the case 2, and the subcase 5' is further moved forward along the vertical portion of the slider 4 in the slit 14. The vertical portion of the slider 4 is located at a backend of the slit 14 of the subcase 5', and the wiring harness portion 6b introduced into the subcase 5' from the vertical portion of the slider 4 is extended in the front-back direction in a substantially oblong U-like shape and is lead out from the front opening 15.

Thus, compared to the conventional art shown in FIG. 7, the length of the slit 3 of the case 2, i.e. the entire length of the case 2, can be reduced for substantially the length of the slit 14 of the subcase 5', i.e. for the amount of stroke of the subcase 5', thereby downsizing the case 2 in the longitudinal direction. The total amount of stroke of the fixation portion 9 of the subcase 5', i.e. the sliding seat, is the sum of the amount of stroke of the slider 4 along the slit 3 of the case 2 and the amount of stroke of the subcase 5' along the slider 4. If the entire length of the case 2 is the same as that of the conventional art shown in FIG. 7, the amount of stroke of the fixation portion 9, i.e. the sliding seat, can be increased more than the conventional art. This is the same as the embodiment shown in FIGS. 1-2.

As shown in FIG. 4, the wiring harness portion 6b in the subcase 5' is made of a plurality of electric wires covered with a protective tube (indicate by the reference sign 6b), and an electric wire portion 6e is exposed at a frontend of the protective tube and lead out to the sliding seat side, and an electric wire portion 6a is exposed at a backend of the protective tube and lead out to the slider 4 side.

As shown in FIG. 3, in the subcase 5' which has moved to the frontend side of the case, an end portion 6g of the wiring harness portion 6 at the slider 4 side and an end portion 6h of the wiring harness portion 6 at the front opening 15 side are positioned at the same height on an imaginary straight line extending in the front-back direction, i.e. a slide axis direction. This is the same for the wiring harness portion 6b in the subcase 5' which has moved to the backend side of the case 2. As the subcase 5' is moved in the front-back direction, the harness extra length is absorbed only by the bending action of the wiring harness portion 6b in the subcase 5', i.e. the action of decrease/increase in diameter (or size) of the curvature of the wiring harness portion 6b. By doing so, the circumferential twist of the wiring harness portion 6b in the subcase 5' and of the wiring harness portion 6a, 6e lead out from the subcase 5' to the slider 4 side or to the back opening 15 side can be prevented, thereby improving the durability of the wiring harness 6.

As shown in FIG. 5 (which is a back view seen from an arrow A of FIG. 4), the subcase 5' is arranged above the case 2 in an opposing and parallel fashion, and the other end 16f of the subcase 5' is slightly projecting outward than the other end 2b of the case 2. The vertical portion of the slider 4 is extending upward from the slit 3 at one side of the case 2 and is penetrating through the frame-like portion 17 located below the subcase 5', and the wiring harness portion 6b is introduced into the subcase 5' in a parallel fashion from the upper end side of the vertical portion of the slider 4.

Figure 6:
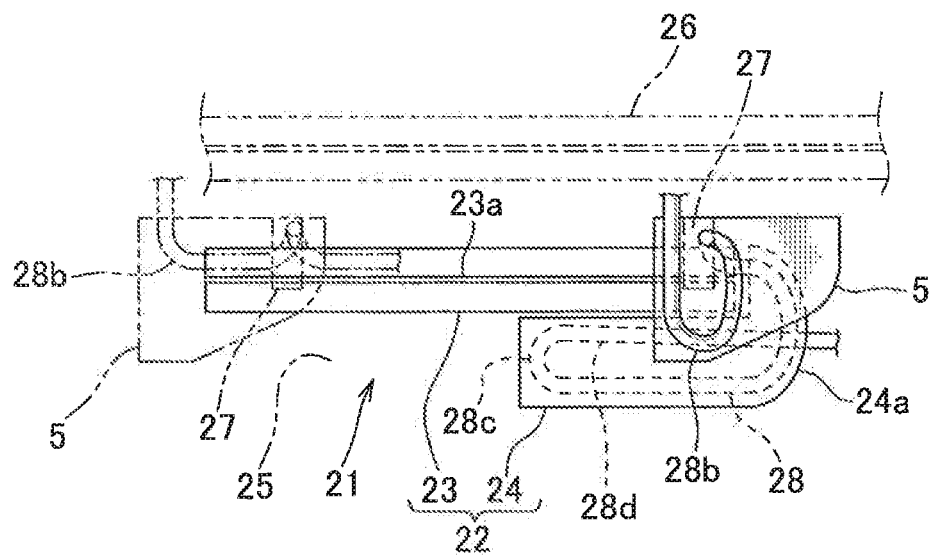
FIG. 6 is a schematic plan view showing another modified example of a sliding power supply device according to the present invention.

FIG. 6 schematically shows a sliding power supply device 21 including a modified example of the above-described case 2 (i.e. a case 22).

This case 22 is similar to that of the conventional art (Patent Literature 3 mentioned above), in which a long, narrow slider movement portion 23 and a short, wide harness housing portion 24 are formed into separate components and are arranged in parallel, such that frontends thereof are connected to (communicated with) each other by a semi-circular guide portion 24a of the harness housing portion 24.

The slider movement portion 23 and the harness housing portion 24 are made of metal or synthetic resin material. The case 22 is arranged in parallel with a vehicle floor 25 such that a longitudinal direction of the case is matched with a front-back direction of a vehicle. In FIG. 6, the right side is a front side of the vehicle. A seat guide rail 26 is provided at the vehicle floor 25 and arranged adjacent to the slider movement portion 23. Also, for the examples shown in FIGS. 1 and 3, a seat guide rail (26) is disposed in parallel to the case 2.

A slider 27 is slidably arranged along a horizontally-long slit 23a of the slider movement portion 23. A subcase 5 which is similar to that of the embodiment of FIG. 1 (or the embodiment of FIG. 3) is fixed to the slider 27 and arranged movable in the front-back direction above the case 22.

One portion of a wiring harness 28 is fixed to the slider 27 and introduced from the slider movement portion 23 through the slider 27 into the subcase 5 located thereabove (in the drawing, a reference sign 28b denotes the wiring harness portion in the subcase), and is wired from a backend side of the subcase 5 to a sliding seat (not shown) side. The other portion of the wiring harness 28 is bent into an arc-like shape from the slider 27 along the guide portion 24a located at the frontend side of the case 22 and is housed in the harness housing portion 24 such that the backend portion is folded (i.e. bent) in a substantially U-shaped fashion (in the drawing, a reference sign 28c denotes a fold portion). A folded portion 28d is lead out from an opening (not shown) at a frontend to the vehicle floor 25 side (i.e. a power source side).

While the slider 27 together with the seat is moved to the frontend side of the slider movement portion 23, the subcase 5 is slidably moved forward with respect to the slider 27 as indicated by a solid line, and thereby the wiring harness portion 28b in the subcase 5 is compressed (contracted) in the front-back direction and located at the back side of the subcase 5. At this time, the wiring harness 28 is housed more in the harness housing portion 24 of the case 22.

Furthermore, while the slider 27 together with the seat is moved to the backend side of the slider movement portion 23, the subcase 5 is slidably moved backward with respect to the slider 27 as indicated by a dotted line, and thereby the wiring harness portion 28b in the subcase 5 is extended in the front-back direction from the frontend to the backend of the subcase 5. During this time, the wiring harness 28 in the harness housing portion 24 of the case 22 is pulled by the slider 27 and drawn into the slider movement portion 23 along the guide portion 24a at the frontend.

In an alternate example, the subcase 5' according to the embodiment shown in FIGS. 3-5 may be bilaterally symmetric and may be employed in place of the subcase 5 of FIGS. 1-2 (in this case, the front wall 16c of the subcase 5' of FIGS. 3-5 is disposed as the back wall 16c of the subcase 5 of FIGS. 1-2).

Furthermore, in the embodiment shown in FIGS. 1-2, the cover portion 5b of the subcase 5 may be omitted, and the subcase 5 may include only the subcase body 5a. In the embodiments shown in FIGS. 1-2 and FIGS. 3-5, when using only the subcase body 5a, only the horizontal bottom wall (i.e. the bottom plate) 13 may be provided (that is, it is not necessary to form the peripheral wall 16), and the droop of the wiring harness portion 6b can be prevented by the horizontal bottom wall (i.e. the bottom plate) 13. Furthermore, only a horizontal upper wall (i.e. a top plate) may be provided in place of the upper cover portion 5b (that is, it is not necessary to form a peripheral wall of the cover portion 5b), and the upward curvature and the uplift of the wiring harness portion 6b can be prevented by the upper wall (i.e. the top plate).

Furthermore, it is possible to provide e.g. an engagement pin (e.g. a hook) (not shown) for suspending a longitudinal portion of the wiring harness portion 6b to e.g. a bottom portion of the sliding seat, instead of using the subcase 5, 5', the horizontal bottom wall (i.e. the bottom plate) 13 and the upper wall (i.e. the top plate). What is important is that, an extra length absorption space for preventing the wiring harness portion 6b from being interfered with another component is provided between the lower (i.e. the floor side) case 2 and the upper sliding seat.

In this case also, similar to the examples shown in FIG. 1 and FIG. 3, the end portion 6g of the wiring harness portion 6 at the slider 4 side and the end portion 6b of the wiring harness portion 6 at the back side or the front side may be disposed at the same height on the imaginary straight line extending in the front-back direction, i.e. a slide axis direction. By doing so, as the sliding seat is moved backward and forward, the harness extra length can be absorbed only by the bending action of the wiring harness portion 6b, i.e. the action of decrease/increase in diameter (or size) of the curvature of the wiring harness portion 6b. By doing so, the circumferential twist of the wiring harness portion 6b can be prevented, thereby improving the durability of the wiring harness 6.

In the respective embodiments described above, the sliding power supply device 1, 1' is applied to the sliding seat of the automobile. However, the sliding power supply device 1, 1' may be applied to a sliding seat of a vehicle other than the automobile or a device or an equipment, or to a sliding structure other than the sliding seat such as a sliding door. In this case, the sliding structure is arranged so as to slide with respect to a fixed structure such as the vehicle floor 8 or the vehicle body.

The embodiments described above are only representative embodiments, and the present invention is not limited to these. That is, the present invention can be modified and implemented in various ways without departing from the gist of the present invention.

INDUSTRIAL APPLICABILITY

A sliding power supply device according to the present invention can be utilized in reducing and downsizing an entire length of a case which houses a wiring harness in an extra length absorbable fashion, for a large slide stroke of a sliding structure such as a sliding seat.

REFERENCE SIGN LIST 1, 1', 21 sliding power supply device
2, 22 case
4, 27 slider
5, 5' subcase (extra length absorption portion)
6, 28 wiring harness
6b, 28b wiring harness portion
13 bottom plate portion

The invention claimed is:

1. A sliding power supply device, comprising:
a long case housing a wiring harness in an extendable and contractable fashion;
a slider arranged slidable in a longitudinal direction of the case and arranged to lead out the wiring harness to outside of the case; and
an extra length absorption portion disposed above the case so as to move forward and backward and arranged to support a wiring harness portion lead outside of the case,
wherein the slider is engaged to the extra length absorption portion so as to be slidable in the longitudinal direction of the case with respect to the extra length absorption portion, and
wherein total amount of stroke of the extra length absorption portion is greater than total amount of stroke of the slider.

2. The sliding power supply device according to claim 1, wherein the extra length absorption portion is a subcase having at least a bottom plate portion,
and
wherein the wiring harness portion lead outside of the case is disposed in the subcase in an extendable and contractable fashion.

3. The sliding power supply device according to claim 1, wherein both ends of the wiring harness portion in a movement direction of the slider are positioned at the same height, and
wherein a harness extra length is absorbed by an extending and contracting action of the wiring harness portion.

4. The sliding power supply device according to claim 2, wherein both ends of the wiring harness portion in a movement direction of the slider are positioned at the same height, and
wherein a harness extra length is absorbed by an extending and contracting action of the wiring harness portion.

\* \* \* \* \*